United States Patent
Kose et al.

(10) Patent No.: US 10,680,797 B2
(45) Date of Patent: Jun. 9, 2020

(54) SECURITY-ADAPTIVE VOLTAGE CONVERSION AS A LIGHTWEIGHT COUNTER MEASURE AGAINST LPA ATTACKS

(71) Applicants: Selcuk Kose, Tampa, FL (US); Weize Yu, Tampa, FL (US)

(72) Inventors: Selcuk Kose, Tampa, FL (US); Weize Yu, Tampa, FL (US)

(73) Assignee: University of South Florida, Tampa, FL (US)

( * ) Notice: Subject to any disclaimer, the term of this patent is extended or adjusted under 35 U.S.C. 154(b) by 221 days.

(21) Appl. No.: 15/967,254

(22) Filed: Apr. 30, 2018

(65) Prior Publication Data

US 2018/0316489 A1 Nov. 1, 2018

Related U.S. Application Data

(60) Provisional application No. 62/491,347, filed on Apr. 28, 2017.

(51) Int. Cl.
| | |
|---|---|
| *G06F 21/00* | (2013.01) |
| *H04L 9/00* | (2006.01) |
| *H04L 9/06* | (2006.01) |
| *H03K 19/00* | (2006.01) |
| *G06F 21/75* | (2013.01) |
| *G06F 21/60* | (2013.01) |

(52) U.S. Cl.
CPC .......... *H04L 9/003* (2013.01); *G06F 21/602* (2013.01); *G06F 21/755* (2017.08); *H03K 19/0019* (2013.01); *H04L 9/0618* (2013.01)

(58) Field of Classification Search
CPC ..... H04L 9/003; H04L 9/0618; G06F 21/602; G06F 21/755; H03K 19/0019
See application file for complete search history.

(56) References Cited

U.S. PATENT DOCUMENTS

2018/0004944 A1* 1/2018 Nagata ................ G06F 11/22

OTHER PUBLICATIONS

Ahmad et al., "Low-power compact composite field AES S-Box/Inv S-Box design in 65 nm CMOS using novel XOR gate," Integr. VLSI J., 2013, 46(4): 333-344.
(Continued)

*Primary Examiner* — Tri M Tran
(74) *Attorney, Agent, or Firm* — Thomas | Horstemeyer, LLP

(57) ABSTRACT

Methods and systems are provided for a security adaptive (SA) voltage converter that receives input power from a power source and provides power to a cryptographic system. The SA voltage converter triggers countermeasures against leakage power analysis (LPA) attacks that slow down an operating frequency of the cryptographic circuit. When an LPA attack is detected, a discharging resistor sinks redundant current to alter the signature of load power dissipation of at the input to the SA voltage converter system. The SA voltage converter includes a converter reshuffling converter. The power dissipation induced by the discharging resistor, as measured at the input received from the power source, is scrambled by the SA voltage converter to increase noise inserted into the input power and to alter the power profile that is measured for the cryptographic circuit.

20 Claims, 13 Drawing Sheets

(56) References Cited

OTHER PUBLICATIONS

Alioto et al., "Effectiveness of leakage power analysis attacks on DPA-resistant logic styles under process variations", IEEE Trans. Circuits Syst. I Reg. Papers, 2014, 61(2): 429-442.

Alioto et al., "Leakage power analysis attacks: A novel class of attacks to nanometer cryptographic circuits," IEEE Transactions on Circuits and Systems I: Regular Papers, 2010, 57(2): 355-367.

Andersen et al., "A 4.6 W/mm 2 power density 86% efficiency on-chip switched capacitor DC-DC converter in 32 nm SOI CMOS," Proc. Appl. Power Electron. Conf. Expo. (APEC), 2013, pp. 692-699.

Avirneni et al., "Countering power analysis attacks using reliable and aggressive designs," IEEE Transactions on Computers, 2014, 63(6): 1408-1420.

Saddam et al., "Evaluation of dynamic voltage and frequency scaling as a differential power analysis countermeasure," Proc. 20th Int. Conj VLSI Des., 2007, pp. 854-862.

Jeon, "Fully integrated on-chip switched capacitor DC-DC converters for battery-powered mixed-signal SoCs," Ph.D. dissertation, Dept. Electr. Comput. Eng., Northeastern Univ., Boston, MA, USA, Oct. 2012.

Kar et al., "Exploiting fully integrated inductive voltage regulators to improve side channel resistance of encryption engines," Proc. ISLPED, 2016, pp. 130-135.

Kopf et al., "An information-theoretic model for adaptive side-channel attacks," Proc. CCS, 2007, pp. 286-296.

Kopf et al., "Vulnerability bounds and leakage resilience of blinded cryptography under timing attacks," Proc. IEEE CSF, 2010, pp. 44-56.

Maghrebi et al., "Entropy-based power attack," Proc. IEEE Int. Symp. HOST, pp. 1-6.

Moradi, "Side-channel leakage through static power-should we care about in practice?," Springer Cryptographic Hardware and Embedded Systems, 2014, pp. 562-579.

Pozo et al., "Side-channel attacks from static power: When should we care?," Proc. Design, AutoIllation and Test in Europe (DATE), 2015, pp. 145-150.

Ramadass et al., "A fully-integrated switched-capacitor step-down dc-dc converter with digital capacitance modulation in 45 nm CMOS," IEEE J. Solid-State Circuits, 2010, 45(12): 2557-2565.

Seeman, "A design methodology for switched-capacitor DC-DC converters," Ph.D. dissertation, Electr. Eng. Comput. Sci., Univ. California Berkeley, Berkeley, CA, USA, May 2009.

Standaert et al., "An overview of power analysis attacks against field programmable gate arrays," Proc. IEEE, 2006, 94(2): 383-394.

Tokunaga et al., "Securing encryption systems with a switched capacitor current equalizer," IEEE J. Solid-State Circuits, 2010, 45(1): 23-31.

Uzun et al., "Converter-gating: A power efficient and secure on-chip power delivery system," IEEE J. Emerging Sel. Topics Circuits Syst., 2014, 4(2): 169-179.

Yu et al., "A voltage regulator-assisted lightweight AES implementation against DPA attacks," IEEE Transactions on circuits and Systems I: Regular Papers, 2016, 63(8): 1152-1163.

Yu et al., "Charge-Withheld Converter-Reshuffling: A Countermeasure Against Power Analysis Attacks," in IEEE Transactions on Circuits and Systems II: Express Briefs, 2016, 63(5): 438-442.

Yu et al., "Exploiting voltage regulators to enhance various power attack countermeasures," IEEE Transactions on Emerging Topics in Computing, 2016, 6(2): 244-257.

Yu et al., "False Key-Controlled Aggressive Voltage Scaling: A Countermeasure Against LPA Attacks," IEEE Transactions on Computer-Aided Design of Integrated Circuits and Systems, 2017, 36(12): 2149-2153.

Yu et al., "Leveraging on-chip voltage regulators as a countermeasure against side-channel attacks," Proc. IEEE DAC, 2015, pp. 1-6.

Yu et al., "Security-Adaptive Voltage Conversion as a Lightweight Countermeasure Against LPA Attacks," IEEE Transactions on Very Large Scale Integration (VLSI) Systems, 2017, 25(7): 2183-2187.

Yu et al., "Time-delayed converter-reshuffling: An efficient and secure power delivery architecture," IEEE Embedded Syst. Lett., 2015, 7(3): 73-76.

Zhu et al., "Employing symmetric dual-rail logic to thwart LPA Attack," IEEE Embedded Systems Letters, 2013, 5(4): 61-64.

\* cited by examiner

SECURITY-ADAPTIVE VOLTAGE CONVERSION AS A LIGHTWEIGHT COUNTER MEASURE AGAINST LPA ATTACKS

CROSS-REFERENCE TO RELATED APPLICATION(S)

This application claims the benefit of priority to U.S. Provisional Patent Application No. 62/491,347, which was filed on Apr. 28, 2017, the entire contents of which is hereby incorporated by reference in its entirety.

STATEMENT REGARDING FEDERALLY SPONSORED RESEARCH OR DEVELOPMENT

This invention was made with government support CCF1350451 awarded by the National Science Foundation. The Government has certain rights to the invention.

TECHNICAL FIELD

Embodiments generally relate to countermeasures against leakage power analysis (LPA) attacks. More specifically, embodiments relate to sinking redundant current by a discharging resistor to alter the signature of load power dissipation of a cryptographic circuit.

BACKGROUND OF THE INVENTION

The power consumption of CMOS-based cryptographic circuits depends strongly on the data being processed by the circuits. A correlation between the power consumed by the circuit and the data being processed by the circuit can be exploited to obtain the stored critical information by a malicious attacker utilizing a side-channel attack (SCAs). Differential power analysis (DPA) attacks are one of the most widely studied SCAs that exploit the switching activities within the cryptographic circuits while the circuits process different input data. Recently, leakage power analysis (LPA) attacks have been disclosed that may be utilized for obtaining the critical information by analyzing the correlation between the input data and leakage power dissipation of the cryptographic circuit. LPA attacks exploit the fact that the leakage current signature of NMOS and PMOS transistors is different than dynamic power, where the amplitude of leakage power is orders of magnitude smaller than the amplitude of dynamic power consumption. To perform a successful LPA attack, the attacker must mitigate the measurement noise that can make the analysis quite difficult due to the small signal-to-noise ratio (SNR) of the monitored leakage power. An effective technique to mitigate the measurement noise is to lower the operating frequency of the cryptographic circuit.

Since the leakage mechanisms in DPA and LPA attacks are quite different, DPA-resistant cryptographic circuits may still be vulnerable against LPA attacks. Therefore, there is a strong need for effective countermeasures against LPA attacks.

SUMMARY OF THE INVENTION

A voltage converter with adaptive security features is proposed as a lightweight countermeasure against leakage power analysis (LPA) attacks. When an LPA attack is sensed by the proposed security-adaptive (SA) voltage converter, a discharging resistor starts sinking redundant current to alter the signature of the load power dissipation. The power dissipation induced by the discharging resistor is scrambled by the SA voltage converter to maximize the amount of the inserted noise to the input power profile of the cryptographic against LPA attacks. As compared with a conventional cryptographic circuit that does not house any countermeasure; the lowest measurement-to-disclose value of a cryptographic circuit that employs the proposed voltage converter can be enhanced over 6145 times against LPA attacks.

Countermeasure against leakage power analysis (LPA) attacks. Since this attack is quite new, there is only a few existing countermeasures in the literature. The proposed countermeasures are one the very first countermeasures against LPA attacks. Also, this is an adaptive countermeasure which is quite new in the field.

In some embodiments, a system is provided for security adaptive voltage conversion. The system includes a voltage converter that has an input coupled to a power source and an output coupled to a cryptographic circuit. The voltage converter receives input power from the power source via the input and supplies power to the cryptographic circuit via the output. A redundant discharge load is connectable to the output of the voltage converter by a switch that is operable to connect or disconnect the redundant discharge load to the output of the voltage converter. A clock frequency sensor coupled to the cryptographic circuit that detects a clock frequency of the cryptographic circuit and controls the connection or the disconnection of the redundant discharge load to the output of the voltage converter in response the detected clock frequency of the cryptographic circuit.

In some embodiments, a method is provided for security adaptive voltage conversion. The method includes receiving input power from a power source via an input of a voltage converter and supplying power to a cryptographic circuit via an output of the voltage converter. A clock frequency sensor coupled to the cryptographic circuit detects a clock frequency of the cryptographic circuit and controls a connection or a disconnection of a redundant discharge load to the output of the voltage converter in response the detected clock frequency of the cryptographic circuit. The redundant discharge load is connectable to the output of the voltage converter by a switch that is operable to connect or disconnect the redundant discharge load to the output of the voltage converter.

Other aspects of the invention will become apparent by consideration of the detailed description and accompanying drawings.

DETAILED DESCRIPTION

Figure 1:
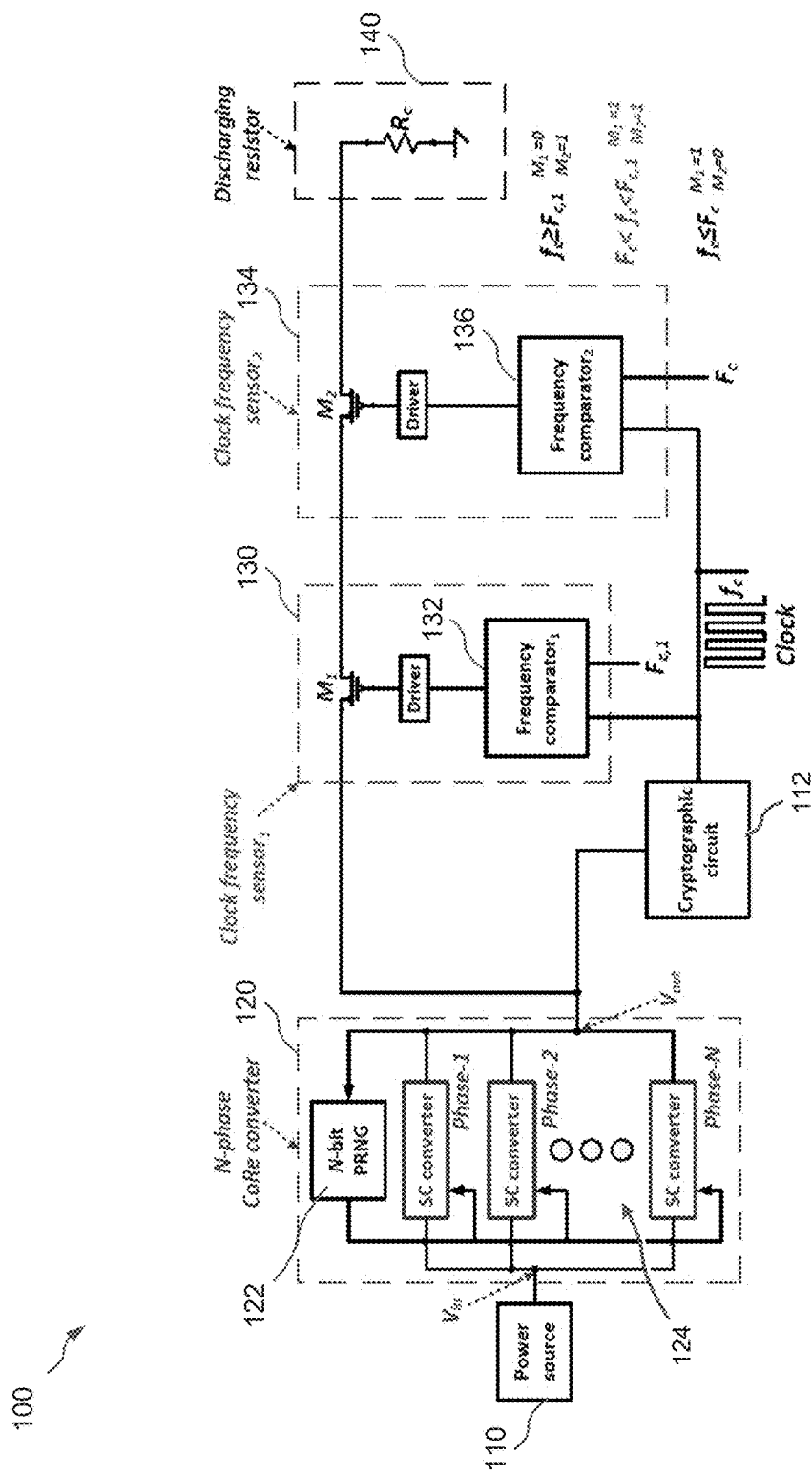
FIG. 1 is a diagram of an example security-adaptive (SA) voltage converter, according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be used to implement various embodiments described herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (e.g., stored on non-transitory computer-readable medium) executable by one or more processors. As such, it should be noted that a plurality of hardware and software based devices, as well as a plurality of different structural components may be utilized to implement various embodiments. Furthermore, and as described in subsequent paragraphs, the specific configurations illustrated in the drawings are intended to exemplify embodiments and that other alternative configurations are possible. For example, "controllers" described in the specification can include standard processing components, such as one or more processors, one or more computer-readable medium modules, one or more input/output interfaces, and various connections (e.g., a system bus) connecting the components. In some instances, the controllers described in the specification may be implemented in one of or a combination of a general processor, an application specific integrated circuit (ASIC), a digital signal processor (DSP), a field programmable gate array (FPGA), combinational logic or state circuitry, or the like.

Converter-reshuffling (CoRe) technique is a countermeasure against DPA attacks with low overhead. CoRe technique utilizes a multi-phase switched capacitor (SC) voltage converter where each phase delivers a portion of the required power to the cryptographic circuit with a different time delay. A pseudo-random number generator (PRNG) is used to scramble the sequence of activation of the converter phases to insert a varying amount of uncertain power noise in each switching period against DPA attacks. However, if the attacker implements a LPA attack on a cryptographic circuit with a CoRe voltage converter, the low leakage power dissipation generated by the cryptographic circuit would only activate a small number of converter phases. The small number of active phases would significantly reduce the entropy of the PRNG in the CoRe voltage converter, making the CoRe technique also vulnerable against LPA attacks.

To increase security against LPA attacks with negligible overhead, a voltage regulator is designed in a security-adaptive fashion. The security-adaptive (SA) voltage converter is designed based on the CoRe voltage converter but modified to sense LPA attacks and insert noise through a discharging resistor only when the device is under an LPA attack. When the SA voltage converter is utilized as the supply voltage of the cryptographic circuit, during the normal and idle modes of operation, no redundant current is being consumed and the SA voltage converter operates conventionally as the CoRe voltage converter. The SA voltage converter is triggered to provide redundant current when the operating clock frequency fc is within a certain range. The activity of the discharging resistor is then reshuffled by the PRNG to scramble the inserted noise profile. Since the proposed SA converter operates conventionally and is only triggered to sink redundant current when the device is under an LPA attack, the power overhead of this countermeasure is negligible.

FIG. 1 is a diagram of an example security-adaptive (SA) voltage converter, according to some embodiments. Shown in FIG. 1 is a security adaptive (SA) voltage converter system 100 that includes a power source 110, a cryptographic circuit 112, an N-phase switched capacitor (SC) voltage converter 120 (that may be referred to as the SC converter 120), a first clock frequency sensor 130, a second clock frequency sensor 134, and a discharging resistor 140 ($R_C$).

The SC converter 120 is operable to function as a CoRe voltage converter and may be referred to as a CoRe voltage converter. The SC converter 120 includes an N-bit pseudo-random number generator (PRNG) 122 and N switched capacitor stages 124. Each of the N switched capacitor stages 124 corresponds to 1 of N phases of the SC converter 120 and may be referred to as a switched capacitor phase. Therefore, the SC converter 120 may be referred to as an N stage SC converter, an N phase SC converter, or a multi-phase SC converter. N is the total number of phases and the total number of stages, and N is even. The SC converter 120 is coupled to the power source 110 to receive power from the power source 110. The SC converter 120 is coupled to the cryptographic circuit to deliver power to the cryptographic circuit 112.

The SC converter 124 is connected to and receives power from the power supply 110 ($V_{in}$), and outputs power to the cryptographic circuit 112 ($V_{out}$). The output power is delivered via a random number of the N phases of the SC converter 120 that are selected by the N-bit PRNG 122. An amount of power drawn from the power supply 110 depends on a demand for power consumption by the cryptographic circuit 112 and by the discharging resistor 140 ($R_C$) when the discharging resistor is coupled to the output of the SC converter 120. The discharging resistor 140 can introduce a second (or redundant) load relative to the load of the cryptographic circuit 112. The discharging resistor 140 may be referred to as a redundant discharging load.

The N-bit PRNG 120 generates a random pattern of output signals for gating the SC converter stages 124 such that an appropriate number of stages 124 are charged and discharged for meeting a demand for power by the cryptographic circuit 112 and by the discharging resistor 140 ($R_C$) when the discharging resistor 140 is coupled to the output of the SC converter 120. Each signal in the random pattern of outputs from the N-bit PRNG 122 is sent to a respective SC converter stage 124. In some embodiments, the N-bit PRNG 122 includes a controller or may be coupled to a controller. The controller may include an electronic processor and a memory that stores instructions, such that when the instructions are executed by the electronic processor, the instructions cause the controller to perform the functions described with respect to the SC converter 120. The controller includes suitable logic, circuitry, interfaces, and/or or code that are operable to determine how many stages of the SC converter 124 need to be activated (charged and/or discharged) to meet the demand for power by the cryptographic circuit 112 and by the discharging resistor 140 ($R_C$) when the discharging resistor 140 is coupled to the SC converter 120.

The cryptographic circuit 112 receives a clock input that determines an operational frequency $f_c$ of the cryptographic circuit 112. The cryptographic circuit 112 may utilize a secret key (also referred to as a correct key) to encrypt or decrypt data, such as a password or other data. An attacker may observe power input to the SC converter 124 ($V_{in}$) to determine data (such as the secret key) and/or operations performed by the cryptographic circuit 112.

The first clock frequency sensor 130 and the second clock frequency sensor 134 also receive the clock input at the operational frequency $f_c$ that is provided to the cryptographic circuit 112. The first clock frequency sensor 130 includes a frequency comparator 132 that compares the operational frequency $f_c$ to a first frequency threshold $F_{C,1}$ and controls a switch $M_1$ in response to the results of the comparison. The second clock frequency sensor 130 includes a second frequency comparator 134 that compares the operational frequency $f_c$ to a second frequency threshold $F_c$ and controls a switch $M_2$ in response to the results of the comparison. In some embodiments the switches $M_1$ and $M_2$ are be transistors. When the switches $M_1$ and $M_2$ are both closed/on ($M_1=1$, $M_2=1$) the discharging resistor 140 ($R_C$) is coupled to the output ($V_{out}$) of the SC converter 120. When the discharging resistor 140 ($R_C$) is coupled to the output ($V_{out}$) of the SC converter 120 the demand for power from the SC converter 120 is increased above the demand for power from the cryptographic circuit 112, such that power input to the SC converter 120 (Vin) from the power supply 110 also increases. In some embodiments, the first clock frequency sensor 130 and/or the second clock frequency sensor 134 includes a controller that controls the opening and closing of the switches $M_1$ and $M_2$ respectively.

The SC converter 120 is configured to implement a converter reshuffling (CoRe) technique where each of the N phases 124 delivers a portion of the power delivered to the cryptographic circuit 112 with a different time delay. The PRNG 122 functions to scramble the sequence of activation of the SC converter phases 124 to insert a varying amount of uncertain power noise during each switching period of the SC converter 120 and serve as a countermeasure against DPA attacks.

When the cryptographic circuit 112 is in a normal working mode, the cryptographic circuit 112 exhibits a high dynamic power consumption (i.e., the clock frequency $f_C$ is high), $M_1$ transistor is in the off-state to let the SA voltage converter system 100 operate similar to the CoRe voltage converter. Under an LPA attack, however, the attacker would lower the clock frequency $f_C$ to mitigate measurement noise.

If the clock frequency $f_C$ is lower than the critical frequency threshold $F_{C,1}$ and higher than the critical frequency threshold $F_C$, both of the $M_1$ transistor and the $M_2$ transistor would be in on-state, letting some amount of redundant current flow through the discharging resistor 140 ($R_C$). The redundant power dissipation induced by $R_C$ is then reshuffled by the N-phase CoRe converter to scramble the inserted power noise.

When the clock frequency $f_C$ of the cryptographic circuit 112 is lower than the critical frequency threshold $F_C$, the $M_2$ transistor would be turned-off, deactivating the discharging resistor 140 ($R_C$) as shown in FIG. 1. When the cryptographic circuit 112 is in an idle mode ($f_C \ll F_C$), the discharging resistor 140 ($R_C$) is therefore inactive to avoid power overhead. The design guidelines on the selection of suitable critical frequencies $F_C$ and $F_{C,1}$ to maximize security are provided below.

Figure 2:
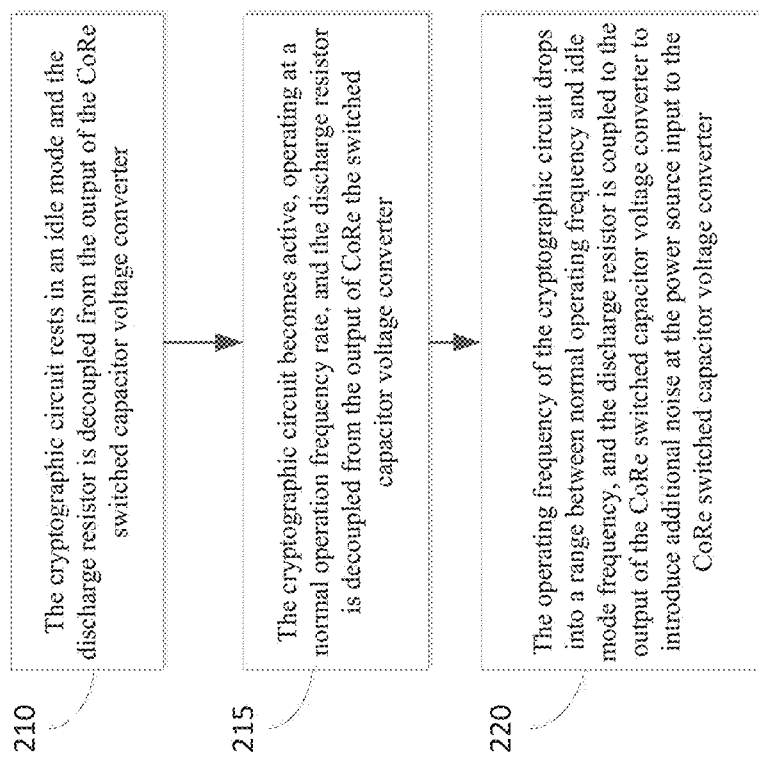
FIG. 2 is a flow chart for operations of a security-adaptive (SA) voltage converter system that is modified when an LPA attack is sensed, according to some embodiments.

FIG. 2 is a flow chart for operations of a security-adaptive (SA) voltage converter system that is modified when an LPA attack is sensed, according to some embodiments.

Referring to FIG. 2, in step 210, the cryptographic circuit 112 is in an idle mode and the discharge resistor 140 is decoupled from the output of the SC converter 120. For example, the second clock frequency sensor 132 detects that the operating frequency is below the low frequency threshold ($f_C < F_C$) and sets the transistor switch $M_2$ in an off state ($M_2=0$). The first clock frequency sensor 130 detects that the operating frequency is below the high frequency threshold and sets the first switch $M_2$ to an on state ($M_2=1$).

In step 215, the cryptographic circuit 112 is in becomes active and operates within a normal operating frequency range ($F_c < f_c < F_{C,1}$). The discharge resistor 140 is decoupled from the output of the SC converter 120 and the SA voltage converter system 100 functions as a converter reshuffling system while providing power to the cryptographic circuit 112. For example, the first clock frequency sensor 130 detects that the operating frequency is above the high frequency threshold ($f_c \geq F_{C,1}$), and sets the transistor switch $M_1$ in an off-state ($M_1=0$). The second clock frequency sensor 132 detects that the operating frequency is above the low frequency threshold and sets the second switch $M_2$ to an on-state ($M_2=1$).

In step 220, the cryptographic circuit 112 becomes under attack and the operating frequency is slowed down. The switches $M_1$ and $M_2$ are both set to an on-state to couple the discharging resistor 140 to the output of the SC converter 120. With the discharge resistor 140 engaged, noise is inserted to the SA converter system 100 input at $V_{in}$ as the discharging resistor 140 ($R_C$) sinks current from the SC voltage converter 120 output $V_{out}$. The power dissipation induced by the discharging resistor 140 is scrambled by the SC voltage converter 120 to increase the amount of the noise inserted into the input power profile of the SA voltage converter system 100 while the system 100 provides power to the cryptographic circuit 112. For example, the first clock frequency sensor 130 detects that the operating frequency is below the high frequency threshold and sets the first switch $M_2$ to an on-state ($M_2=1$). The second clock frequency sensor 132 detects that the operating frequency is above the low frequency threshold and sets the second switch $M_2$ to an on-state ($M_2=1$).

When the SC converter 120 is utilized as the supply voltage for the cryptographic circuit 112 during the normal and idle modes of operation, no redundant current is being consumed by the discharging resistor 140 ($R_C$) and the SC converter 120 operates conventionally as a CoRe voltage converter. The SA voltage converter system 100 is triggered to provide redundant current to the discharging resistor 140 ($R_C$) when the operating clock frequency $f_C$ is within a range above an idle frequency threshold $F_c$ and below a normal operation frequency threshold $F_{C,1}$. The activity of the discharging resistor 140 ($R_C$) is then reshuffled by the PRNG 122 to scramble the inserted noise profile at the input to the SC converter 120 (Vin). Since the SA converter system 100 operates conventionally and is only triggered to sink redundant current by the discharging resistor 140 ($R_C$) when the cryptographic device 112 is under an LPA attack, the power overhead of this countermeasure is negligible. Therefore, the system 100 is designed in a security-adaptive fashion.

Figure 3:
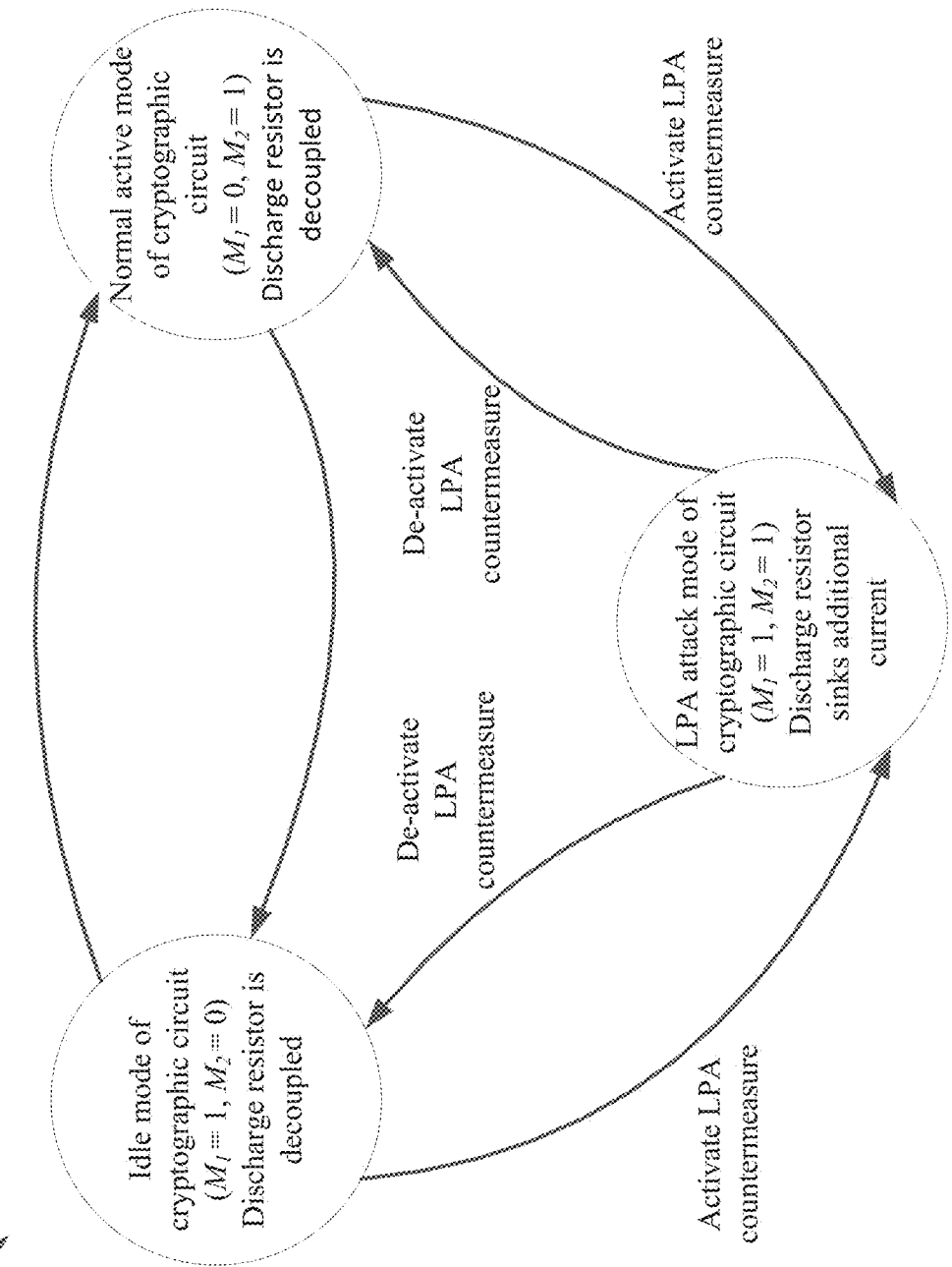
FIG. 3 illustrates security states in a security adaptive voltage converter system, according to some embodiments.

FIG. 3 illustrates security states in a security adaptive (SA) voltage converter system, according to some embodiments. Referring to FIG. 3 a security adaptive voltage converter system 100 is operable to adapt activation of security breach countermeasures to the security states of the cryptographic circuit 112. LPA attack counter measures are engaged only when the SA converter system 100 detects an LPA attack is underway. In this manner, the SA converter system 100 reduces power consumption relative to running the LPA attack countermeasures continuously. When the cryptographic circuit advances from an idle mode to an LPA attack mode, or from a normal active mode to an LPA attack mode, the SA converter system 100 activates the LPA attack countermeasures by introducing additional scrambled noise at the system 100 input at $V_{in}$. When the cryptographic circuit advances from the LPA attack mode to the idle mode or to the normal active mode, the SA converter system 100 de-activates the LPA attack countermeasure and stops the delivery of the added scrambled noise at the system 100 input at $V_{in}$.

Parameter Design

To maximize the entropy of the N-bit PRNG that resides within the SA voltage converter, the number of active phases of an SA voltage converter in each switching period should be around N/2 (the entropy of the N-bit PRNG reaches the maximum value $$-\binom{N}{N/2} \times \frac{1}{\binom{N}{N/2}} \log_2 \frac{\binom{N}{N/2}}{\binom{N}{N/2}} = \log_2 \binom{N}{N/2}).$$

Assuming the mean value of leakage power dissipation of the cryptographic circuit within a switching period under LPA attacks is $\mu_c$ and the output voltage of an N-phase CoRe converter within the SA voltage converter is $V_{out}$. When the cryptographic circuit employs an SA voltage converter, if the discharging resistor $R_C$ is activated, the power dissipation $P_C$ consumed by the discharging resistor $R_C$ can be denoted as $Pc=V_{out}^2/R_C$. The mean value $\mu_t$ of the total load power dissipation of the SA voltage converter within a switching period can be approximated as $$\mu_t \approx \mu_c + \frac{V_{out}^2}{R_c}. \tag{1}$$

The output current $I_{out}$ delivered by a single SC converter phase is $$I_{out}=2C_f(V_{in}-2V_{out})kf_s, \tag{2}$$

where $C_f$ is the flying capacitance within each phase, $V_{in}$ is the input voltage from the power source, $f_s$ is the switching frequency of the SC converter, and k is the $f_s$ and $C_f$ dependent parameter.

Since around half of the total phases should be active in each switching period to maximize the entropy of the N-bit PRNG, the following approximated equation should be satisfied $$V_{out} \times \frac{N}{2} \times I_{out} \approx \mu_c + \frac{V_{out}^2}{R_c'}, \tag{3}$$

where $R'_c$ is the optimized resistance value of the discharging resistor $R_C$ that maximizes the security of the cryptographic circuit. $R'_C$ therefore, can be determined as $$R'_c \approx \frac{V_{out}^2}{V_{out}NC_f(V_{in}-2V_{out})kf_s - \mu_c}. \tag{4}$$

Security Evaluation Against LPA Attacks

To quantify the security of a cryptographic circuit that employs the proposed SA voltage converter against LPA attacks, the correlation coefficient between the input and load power profiles of the SA voltage converter needs to be modeled. The correlation coefficient γ of a voltage converter is $$\gamma = \frac{\sum_{i=1}^{n}(P_{l,i}-\overline{P_l})(P_{in,i}-\overline{P_{in}})}{\sqrt{\sum_{i=1}^{n}(P_{l,i}-\overline{P_l})^2 \sum_{i=1}^{n}(P_{in,i}-\overline{P_{in}})^2}}, \tag{5}$$

where n is the total number of the input or load power data samples, $P_{l,i}$ ($P_{in,i}$) is the $i^{th}$, (i=1, 2, ..., n) load (input) power of the voltage converter, and $\overline{P_l}(\overline{P_{in}})$ is the corresponding total Average load (input) power.

A. Sampling a Single Clock Period as One Sample of Input Power Data

In LPA attacks, in order to filter the measurement noise, the clock frequency $f_c$ of the cryptographic circuit needs to be sufficiently reduced $$(\text{i.e., } f_c \approx \frac{1}{F_0}f_s)$$

where $F_0$ is an integer that can reasonably filter out the measurement noise). However, when a cryptographic circuit implemented with a CoRe or an SA voltage converter is under LPA attacks, in addition to filtering the measurement noise, the reshuffling noise induced by PRNG can also be filtered if the clock frequency $f_c$ is further reduced. For example, the clock frequency $f_c$ can be further reduced to $$f_c \approx \frac{1}{F}f_s$$

(F is an integer and F>$F_0$) to also filter the reshuffling noise.

Figure 4:
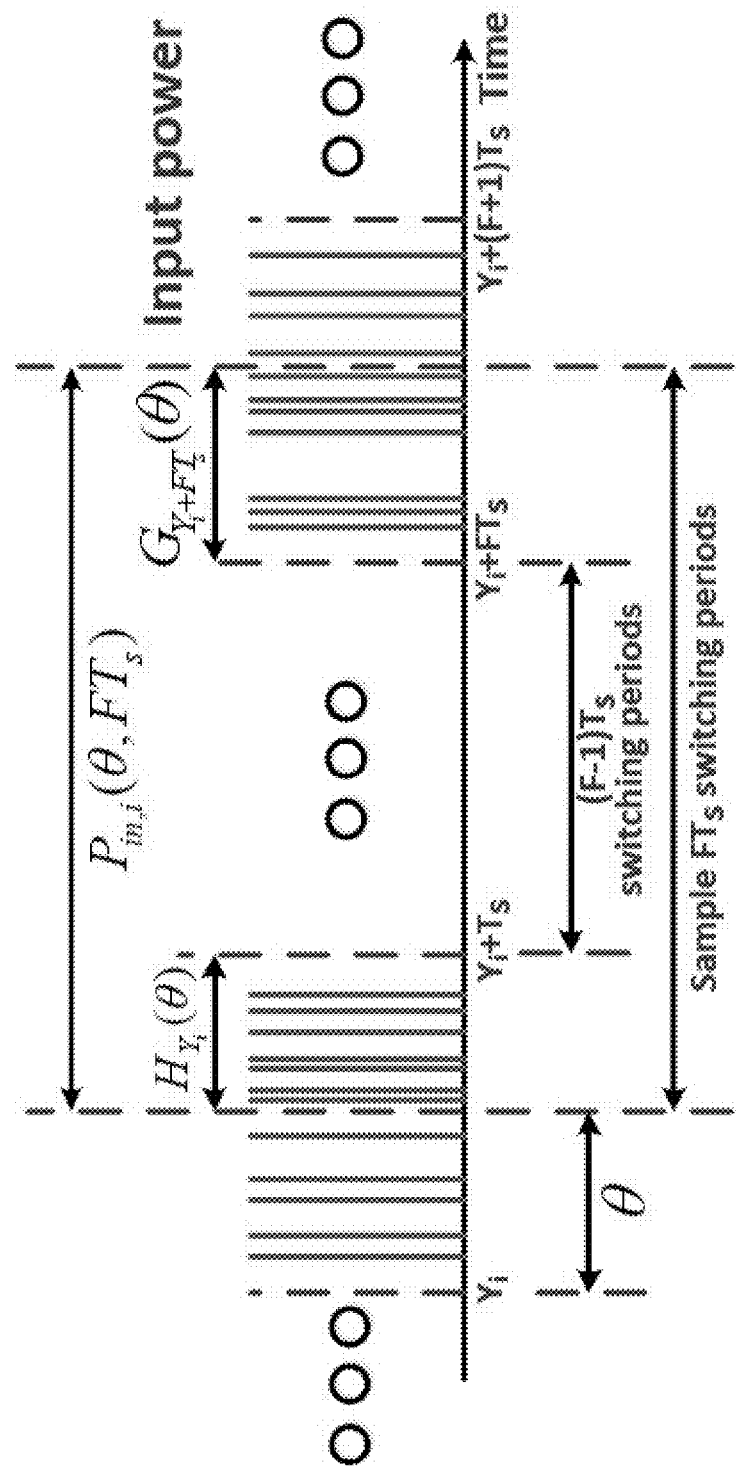
FIG. 4 illustrates an input power profile of a cryptographic circuit that employs a security-adaptive (SA) voltage converter under leakage power analysis (LPA) attacks when an attacker selects a single clock period as one sample of input power data, according to some embodiments

FIG. 4 illustrates an input power profile of a cryptographic circuit that employs a security-adaptive (SA) voltage converter under leakage power analysis (LPA) attacks when an attacker selects a single clock period as one sample of input power data, according to some embodiments. Ts is the switching period of the SA voltage converter, $Y_i$ is the starting time point of the first switching period for sampling the $i^{th}$ input power data, and $\theta$ is the phase difference between the switching period and input power data sampling, according to some embodiments.

If the attacker selects a single clock period (F number of switching periods) as one sample of the input power data as shown in FIG. 4, the sampled input power $P_{in,i}(\theta, FT_s)$ is $$P_{in,i}(\theta, FT_s) = (H_{Y_i}(\theta) + G_{Y_i+FT_s}(\theta))P_0 + \frac{(F-1)\left(P_i + \frac{V_{out}^2}{R_c}\right)}{\eta_c}, \quad (6)$$

where $n_c$ is the power efficiency of the N-phase CoRe converter in the SA voltage converter, $P_0$ is the power consumed by a single active phase in the SA voltage converter, and $P_i$ is the leakage power dissipation of the cryptographic circuit induced by the $i^{th}$ input data. $H_{Y_i}(\theta)$ and $G_{Y_i+FT_s}(\theta)$ are the corresponding number of active phases, as illustrated in FIG. 4. The corresponding load power $P_{l,i}(\theta, FT_s)$ of the SA voltage converter (which is correlated with $P_{in,i}(\theta; FT_s)$ can be written as $$P_{l,i}(\theta, FT_s) = \left(1 - \frac{\theta}{2\pi}\right)P_i + (F-1)P_i + \frac{\theta}{2\pi}P_i = FP_i. \quad (7)$$

As compared to a conventional cryptographic circuit (i.e., without any countermeasure), the MTD enhancement ratio $R(FT_s)$ of a cryptographic circuit that employs a voltage converter is $$R(FT_s) \propto \frac{1}{\left(\frac{1}{2\pi}\int_0^{2\pi} \gamma(\theta, FT_s)d\theta\right)^2}, \quad (8)$$

Where $\frac{1}{2\pi}\int_0^{2\pi} \gamma(\theta, FT_s)d\theta$ is the average correlation coefficient between the input and output power profiles of the voltage converter.

As compared to an LPA attack on a conventional cryptographic circuit with clock frequency $$f_c \approx \frac{1}{F_0}f_s,$$

the MTD value would be enhanced by $F/F_0$ times if the attacker implements an LPA attack on a cryptographic circuit which employs a voltage converter with a slower clock frequency $$f_c \approx \frac{1}{F_0}f_s.$$

As a result, the MTD enhancement ratio $R_1(FT_s)$ of a cryptographic circuit that employs a voltage converter with a variable clock frequency can be written as $$R_1(FT_s) \simeq \frac{F}{F_0}\frac{1}{\left(\frac{1}{2\pi}\int_0^{2\pi}\gamma(\theta, FT_s)d\theta\right)^2}. \quad (9)$$

Figure 5A:
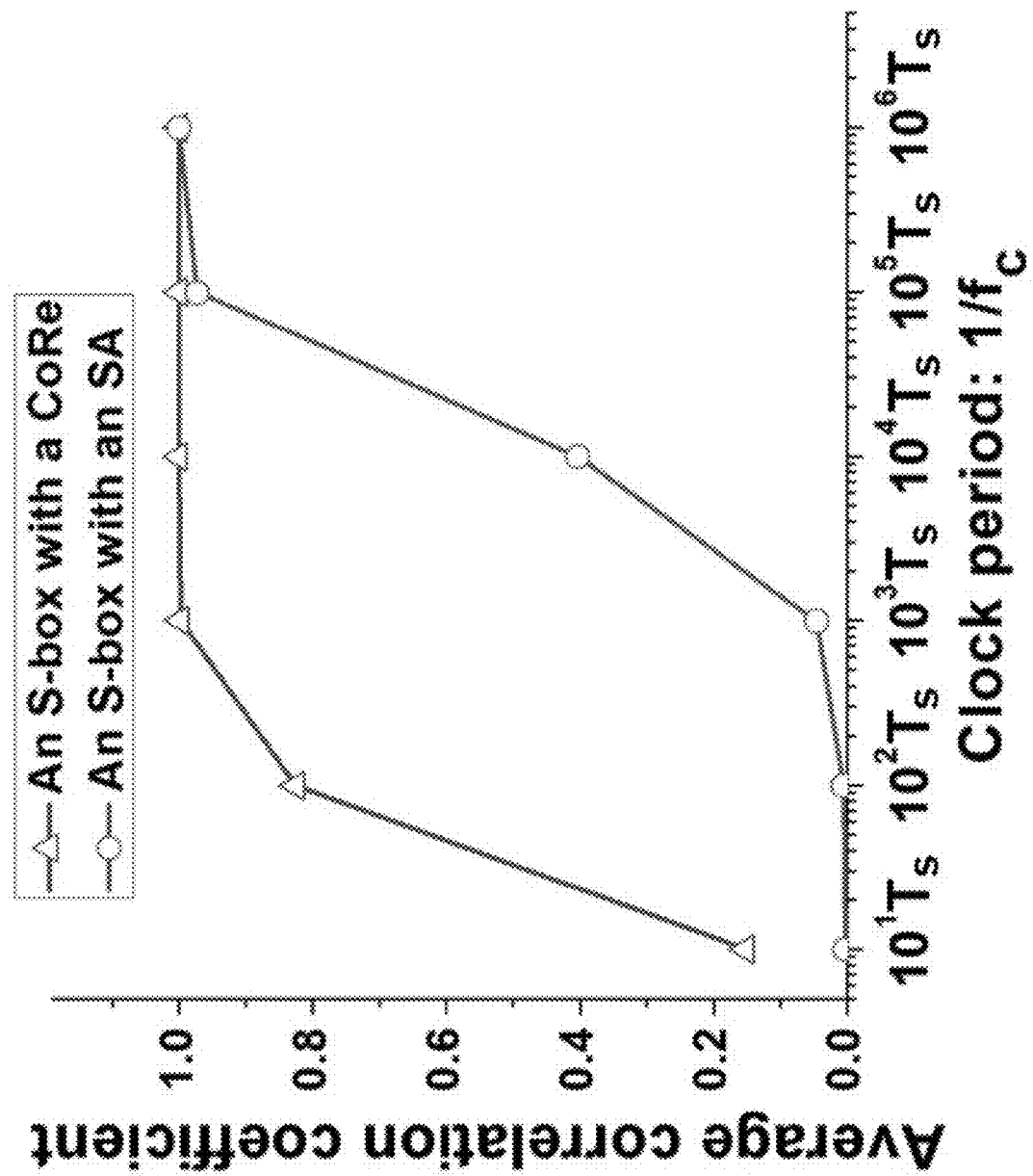
FIGS. 5A-5B are plots of an average correlation coefficient versus clock period $1/f_c$ (FIG. 5A), and MTD enhancement ratio $R_1$ ($FT_s$) versus clock period $1/f_c$ (FIG. 5B), according to some embodiments.
Figure 5B:
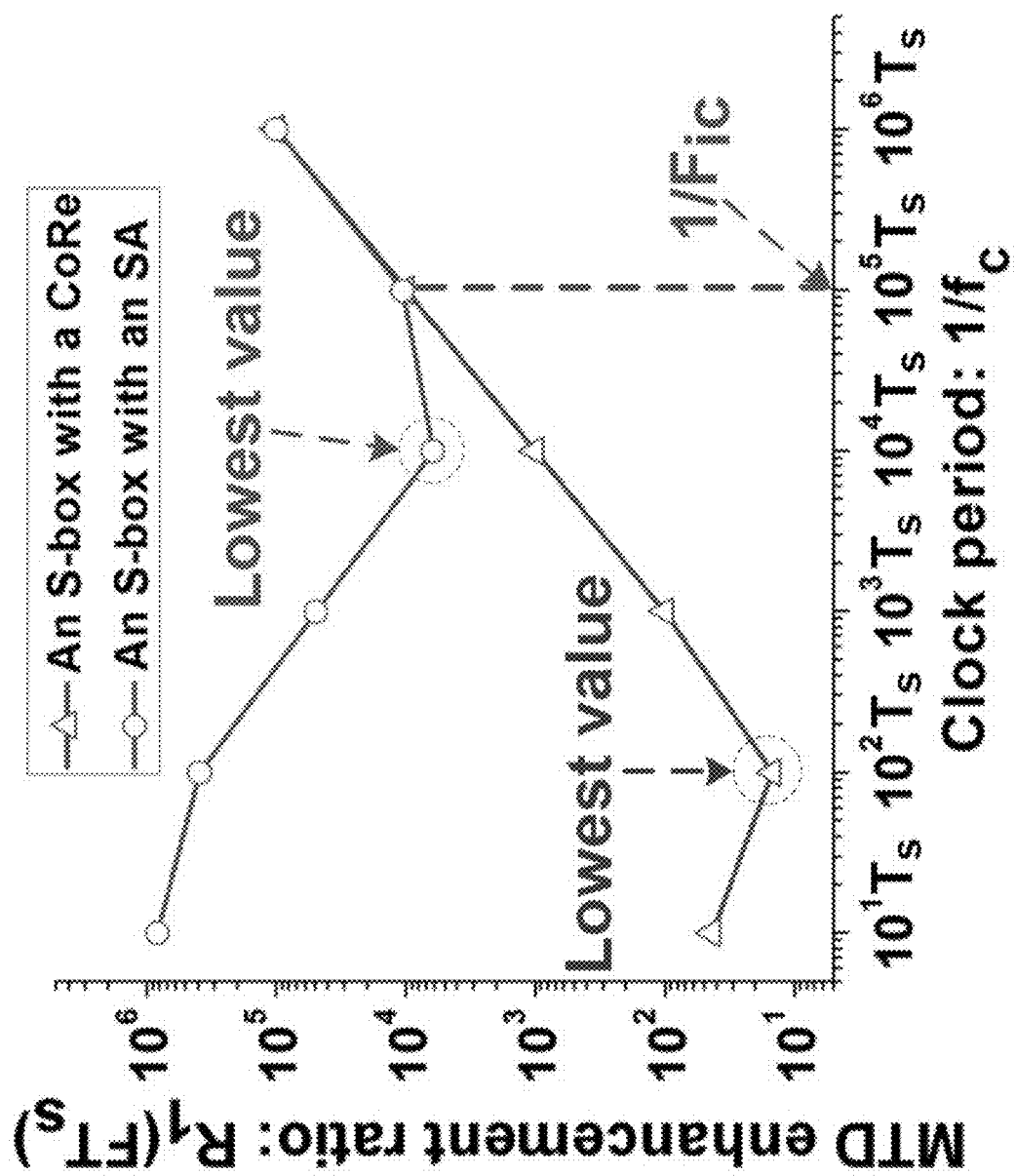

FIGS. 5A-5B are plots of an average correlation coefficient versus clock period $1/f_c$ (FIG. 5A), and MTD enhancement ratio $R_1$ ($FT_s$) versus clock period $1/f_c$ (FIG. 5B), according to some embodiments.

Advanced encryption standard (AES) utilizes multiple S-Boxes to perform non-linear mathematical transformations to mask the relationship between the ciphertext and the secret key. To validate the mathematical analysis, a 130 nm CMOS Sbox is used as the cryptographic circuit that is powered, respectively, by a CoRe voltage converter and by an SA voltage converter. Both circuits are simulated in Cadence. $\{F_0=10\}^3$ and N=32. The average correlation coefficient of the SA voltage converter is quite lower than the average correlation coefficient of the CoRe voltage converter when the attacker selects a fast clock frequency to perform the LPA attack, as shown in FIG. 5A. The lowest MTD enhancement ratio of an S-box that employs an SA voltage converter under LPA attacks is ~6145 when clock period is about $10^4 T_s$ while the lowest MTD enhancement ratio of an S-box that employs a CoRe voltage converter under LPA attacks is about 14.7 when clock period is about $10^2 T_s$ as shown in FIG. 5B.

B. Sampling Multiple Clock Periods as One Sample of Input Power Data

Figure 6:
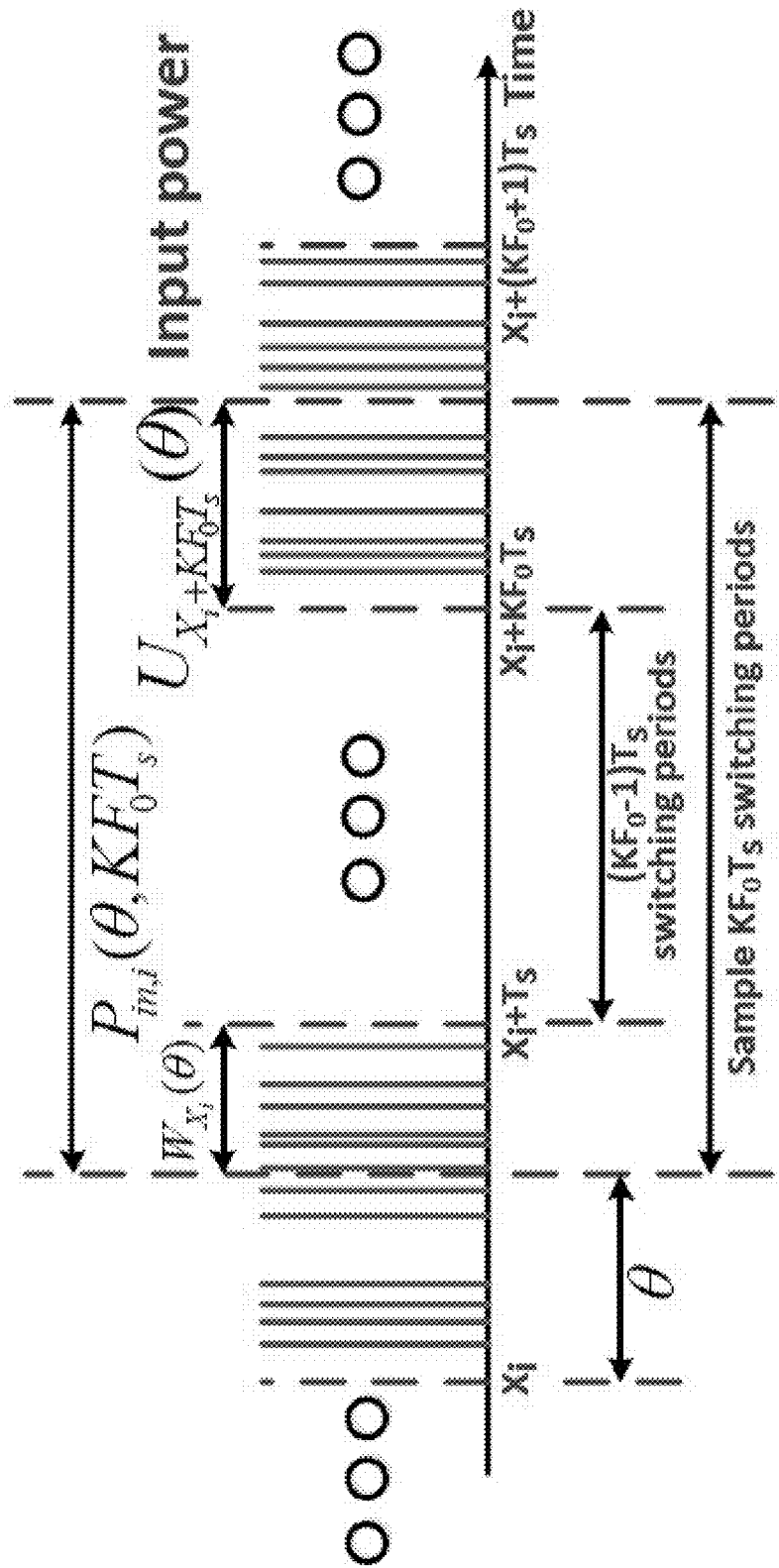
FIG. 6 illustrates an input power profile of a cryptographic circuit that employs an SA voltage converter under LPA attacks when the attacker selects a variable number of clock periods as one sample of input power data, according to some embodiments.

FIG. 6 illustrates an input power profile of a cryptographic circuit that employs an SA voltage converter under LPA attacks when the attacker selects a variable number of clock periods as one sample of input power data, according to some embodiments. $X_i$ is the starting time point of the first switching period for sampling the $i^{th}$ input power data.

The technique of sampling multiple clock/switching periods as one sample of input power data is quite efficient for filtering the power noise generated from reshuffling-based voltage converters in DPA attacks. When an attacker implements an LPA attack on a cryptographic circuit that houses a CoRe voltage converter or an SA voltage converter, the attacker can also filter the reshuffling noise by sampling K, (K≥2) number of clock periods as one sample of input power data instead of lowering the clock frequency $$\left(f_c \approx \frac{1}{F_0}f_s\right)$$

further, as shown in FIG. 6. The corresponding input power $P_{in,i}(\theta,KF_0T_s)$ and load power $P_{l,i}(\theta;KF_0T_s)$ of the SA voltage converter can be, respectively, written as $$P_{in,i}(\theta, KF_0T_s) = (W_{X_i}(\theta) + U_{X_i+KF_0T_s}(\theta))P_0 + \quad (10)$$

$$\frac{(F_0-1)\left(P_{(i-1)K+1} + \frac{V_{out}^2}{R_c}\right)}{\eta_c} + F_0\sum_{j=2}^{K}\frac{\left(P_{(i-1)K+j} + \frac{V_{out}^2}{R_c}\right)}{\eta_c},$$

-continued $$P_{L,i}(\theta, KF_0T_s) = \left(1 - \frac{\theta}{2\pi}\right)P_{(i-1)K+1} + \quad (11)$$

$$(F_0 - 1)P_{(i-1)K+1} + F_0\sum_{j=2}^{K} P_{(i-1)K+j} + \frac{\theta}{2\pi}P_{(i-1)K+K+1},$$

where $P_{(i-1)K+j}$, (j=1,2, ... ) is the leakage power dissipation of the cryptographic circuit induced by the $((i-1)K+j)^{th}$ input data. $W_{X_i}(\theta)$ and $U_{X_i}+KF_0T_s(\theta)$ are the corresponding number of active phases, as illustrated in FIG. 6.

As compared to sampling a single clock period as one sample of input power data, sampling K number of clock periods as one sample of input power data would enhance the MTD value to K times. Therefore, the MTD enhancement ratio $R_2(KF_0T_s)$ of a cryptographic circuit that employs a voltage converter is $$R_2(KF_0T_s) \simeq K\frac{1}{\left(\frac{1}{2\pi}\int_0^{2\pi}\gamma(\theta, KF_0T_s)d\theta\right)^2}, \quad (12)$$

when utilizing K number of clock periods as one sample of input power data.

Figure 7A:
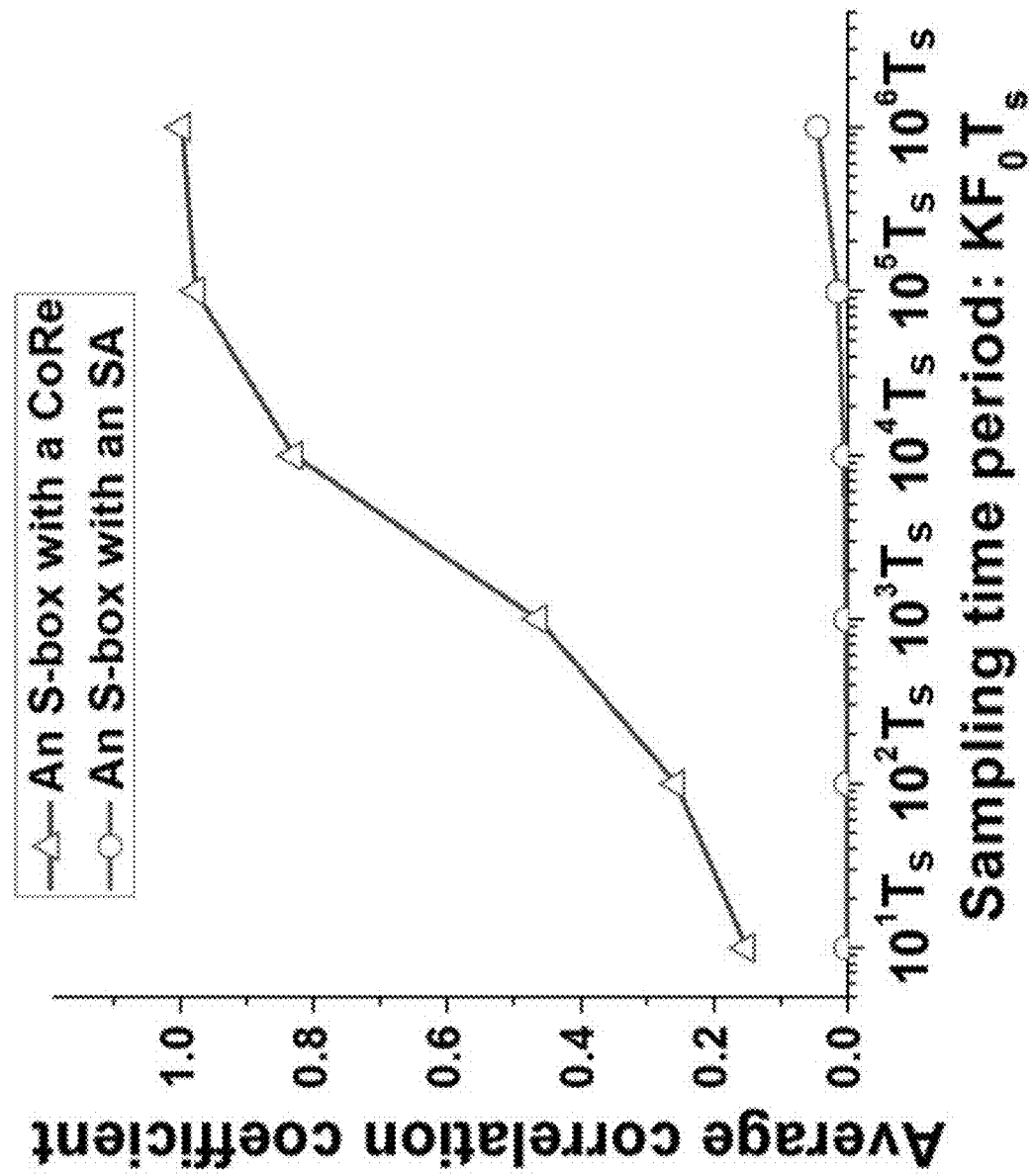
FIGS. 7A-7B illustrate average correlation coefficient versus sampling time period $KF_0T_s$ (FIG. 7A). MTD enhancement ratio $R_2$ ($KF_0T_s$) versus sampling time period $KF_0T_s$ ($F_0=10$ and $N=32$) (FIG. 7B), according to some embodiments.
Figure 7B:
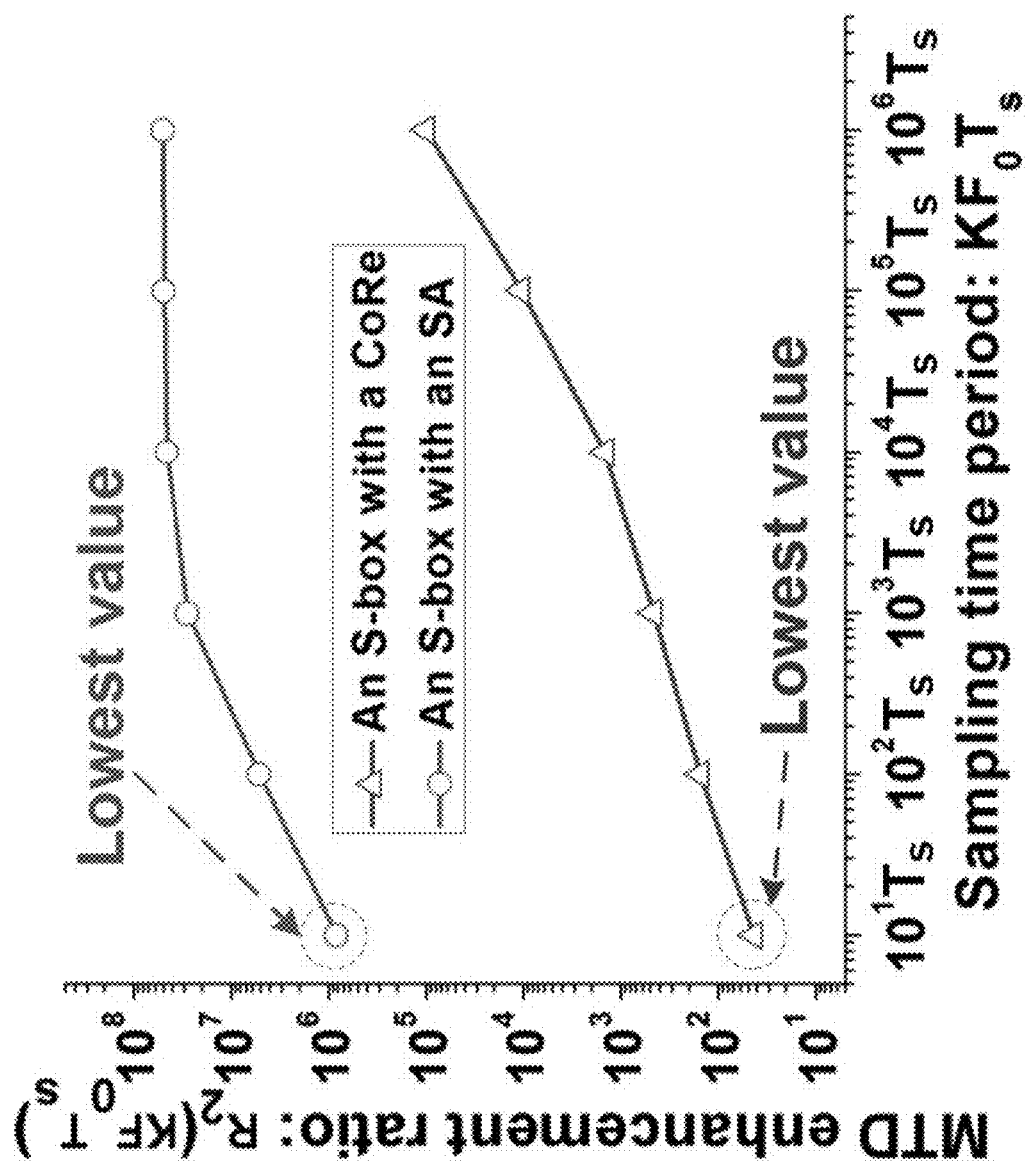

FIGS. 7A-7B illustrate average correlation coefficient versus sampling time period $KF_0T_s$ (FIG. 7A). MTD enhancement ratio $R_2$ ($KF_0T_s$) versus sampling time period $KF_0T_s$ ($F_0=10$ and $N=32$) (FIG. 7B), according to some embodiments.

When the attacker increases the sampling time period to $KF_0T_s$, the average correlation coefficient of the SA voltage converter has a marginal enhancement, as shown in FIG. 7A. This indicates that sampling multiple clock periods as one sample of input power data to mitigate noise is not sufficiently effective. The lowest MTD enhancement ratio of an S-box with an SA (CoRe) voltage converter is 826446 (43) (shown in FIG. 7B), which is much higher than the lowest MTD enhancement ratio 6145 (14.7) (shown in FIG. 5A). That means further reducing the clock frequency $f_c$ is more effective than sampling multiple clock periods as one sample of input power data to enhance the power of LPA attacks on an S-box with a voltage converter. The primary reason is that under the same sampling time period ($FT_s=KF_0T_s$), the variance of the load power of a voltage converter with a variable clock frequency $D(P_{L,i}(\theta; FT_s))$ is $$D(P_{L,i}(\theta,FT_s))=D(FP_i)=D(KF_0P_i)=K^2F_0^2\sigma_s^2, \quad (13)$$

where $\sigma_s^2$ is the variance of the leakage power dissipation of the cryptographic circuit. However, the variance of load power of a voltage converter while sampling K number of clock periods as one sample of input power data D ($P_{L,i}(\theta; KF_0T_s)$) is ($F_0>1$)

$$D(P_{L,i}(\theta, KF_0T_s)) = \quad (14)$$

$$D\left(\left(1-\frac{\theta}{2\pi}\right)P_{(i-1)K+1} + (F_0-1)P_{(i-1)K+1}\right) + D\left(F_0\sum_{j=2}^{K}P_{(i-1)K+j}\right) +$$

$$D\left(\frac{\theta}{2\pi}P_{(i-1)K+K+1}\right) = \left(F_0 - \frac{\theta}{2\pi}\right)^2\sigma_s^2 + F_0^2(K-1)\sigma_s^2 + \left(\frac{\theta}{2\pi}\right)^2\sigma_s^2 =$$

$$KF_0^2\sigma_s^2 - \frac{\theta}{\pi}F_0\sigma_s^2 + \frac{\theta^2}{2\pi^2}\sigma_s^2 < KF_0^2\sigma_s^2 - \frac{\theta}{\pi}\sigma_s^2 + \frac{\theta^2}{2\pi^2}\sigma_s^2 \le$$

$$KF_0^2\sigma_s^2 - \frac{\theta}{\pi}\frac{\theta}{2\pi}\sigma_s^2 + \frac{\theta^2}{2\pi^2}\sigma_s^2 = KF_0^2\sigma_s^2.$$

As compared to sampling K number of clock periods as one sample of input power data, further lowering clock frequency $f_c$ can therefore enhance the variance of the load power of the voltage converter over K times. A larger variance of the load power enhances the SNR of the voltage converter and decreases the lowest MTD enhancement ratio.

Lowering clock frequency $f_c$ further is more efficient than sampling multiple clock periods as one sample of input power data to enhance the power of LPA attacks. When the attacker further lowers clock frequency $f_c$, as shown in FIG. 3(b), the critical frequency $F_c$ can be selected as $1/(10^5T_s)$. The intuitive explanation is that when the clock frequency $f_c$ is lower than the critical frequency $F_c=1/(10^5T_s)$, the $M_2$ transistor would be turned-off to make the SA voltage converter behave as a CoRe voltage converter. The MTD enhancement ratio of an S-box with an SA voltage converter is almost the same as the MTD enhancement ratio of an S-box with a CoRe voltage converter when the clock frequency $f_c$ is lower than $1/(10^5T_s)$, as shown in FIG. 3(b). The security of an S-box with an SA voltage converter against LPA attacks therefore would not be compromised when $F_c=1/(10^5T_s)$.

Circuit Level Verification

To validate the proposed countermeasure with circuit level simulations, a 130 nm CMOS S-box is used as the load to simulate the correlations between the input and load power profiles of different voltage converters. A 32-phase 2:1 CoRe voltage converter and a 32-phase 2:1 SA voltage converter are used in the simulations. The input voltage $V_{in}$ and output voltage $V_{out}$ of the voltage converters used in the simulations are, respectively, 2.4 V and 1.2 V. Additionally, the clock frequency $f_c$ of the S-box to perform an LPA attack is reduced to 2 MHz and the variation range of the switching frequency $f_s$ of the voltage converter is $f_s\in[19\text{ MHz}, 21\text{ MHz}]$.

Figures 8A, 8B:
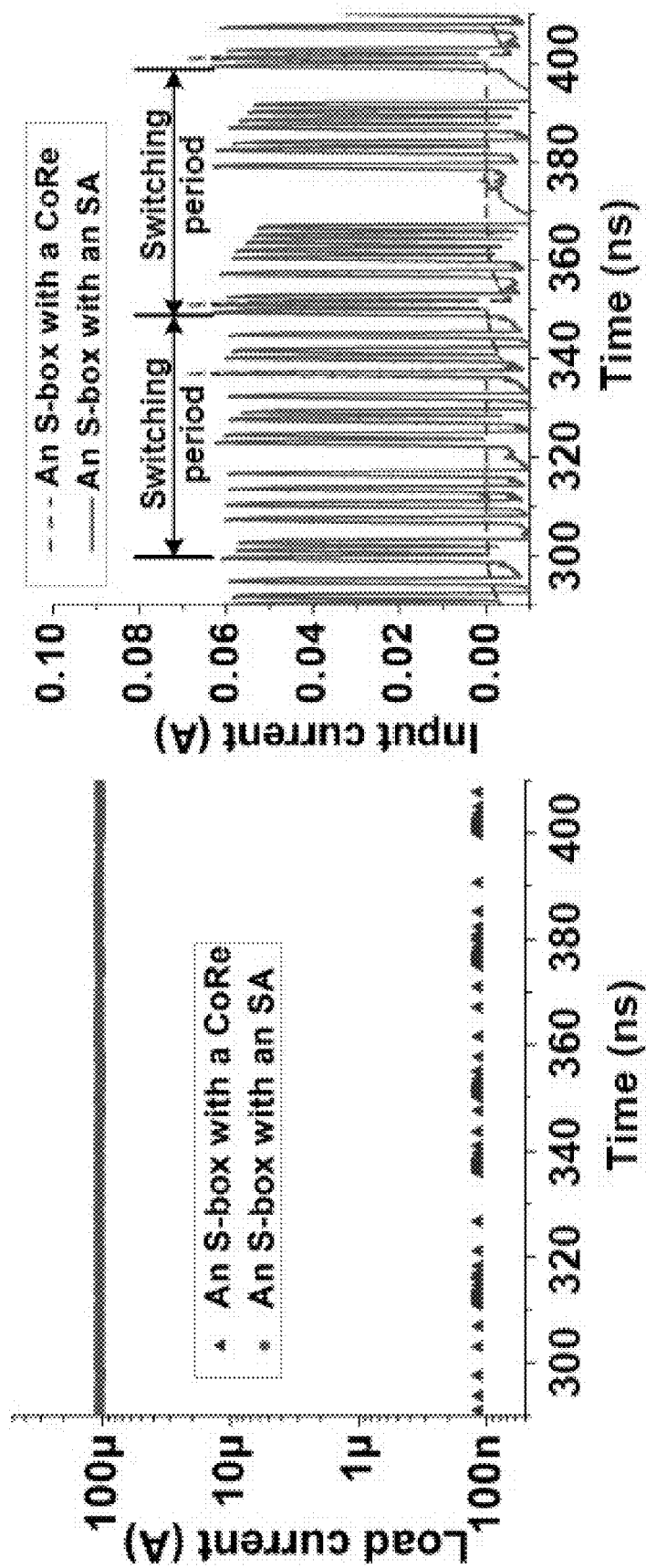
FIGS. 8A-8B illustrate load current profile of an S-box that employs a CoRe voltage converter and an S-box that employs an SA voltage converter (FIG. 8A), and input current profile of an S-box that employs a CoRe voltage converter and an S-box that employs an SA voltage converter (FIG. 8B), according to some embodiments.

FIGS. 8A-8B illustrate load current profile of an S-box that employs a CoRe voltage converter and an S-box that employs an SA voltage converter (FIG. 8A), and input current profile of an S-box that employs a CoRe voltage converter and an S-box that employs an SA voltage converter (FIG. 8B), according to some embodiments.

The load current of the SA voltage converter is significantly higher than the CoRe voltage converter when the S-box is under LPA attacks, as shown in FIG. 8A. The high load power dissipation of the SA voltage converter from the discharging resistor $R_c$ is reshuffled in the input power profile to generate high power noise against LPA attacks. As demonstrated in FIG. 8A, only a single phase is active in a switching period in an S-box that employs a CoRe voltage converter while 16 phases are activated in a switching period in an S-box that employs an SA voltage converter. The large number of active phases in each switching period would significantly enhance the entropy of the PRNG from $$\log_2\binom{32}{1} \text{ to } \log_2\binom{32}{16},$$

generating a large amount of uncertain power noise in input power profile against LPA attacks.

LPA Attacks Simulation

Figure 9A:
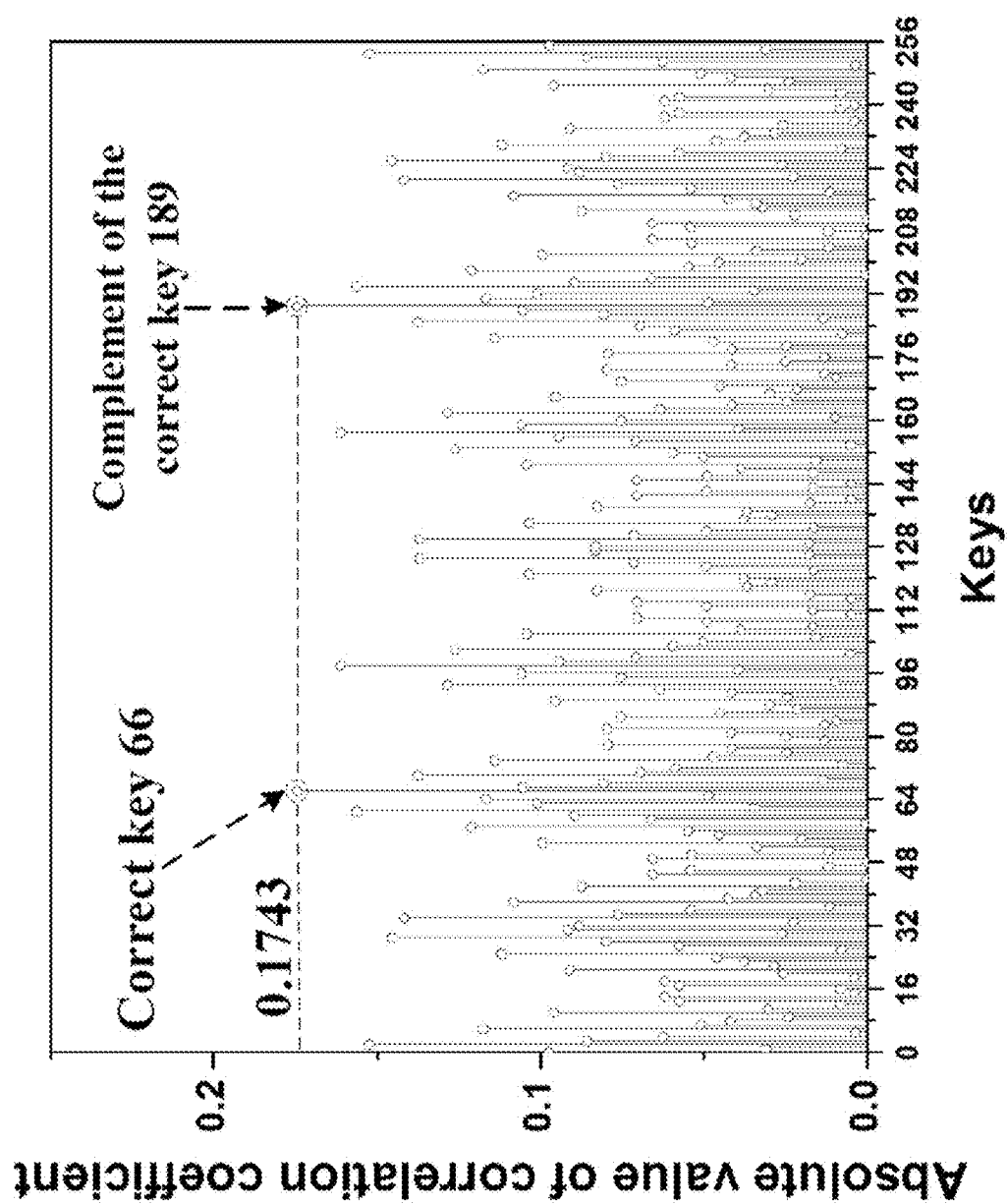
FIGS. 9A-9C illustrate, LPA attacks simulation ($N=32$ and $F_0=10$, according to some embodiments.
Figure 9B:
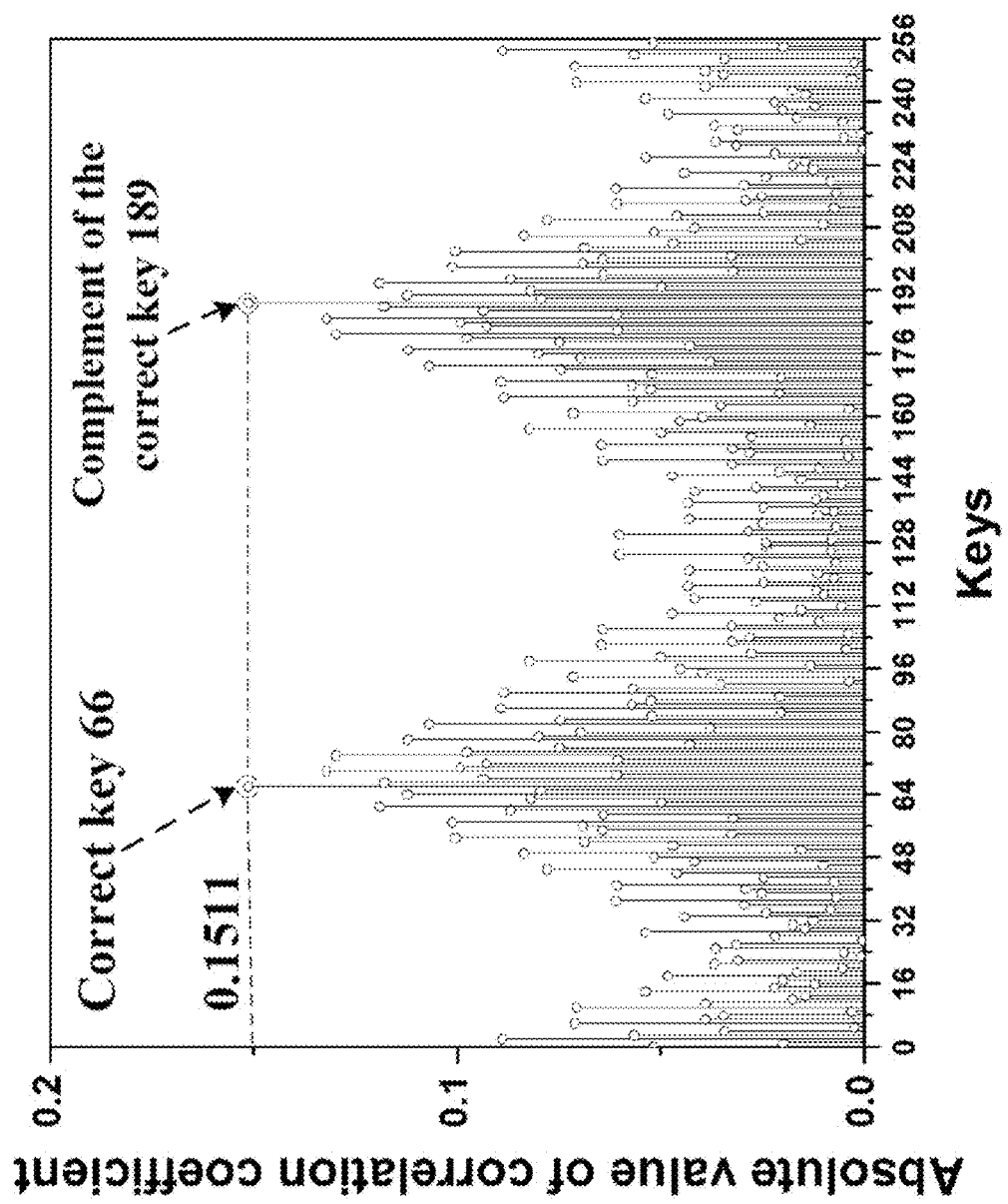
Figure 9C:
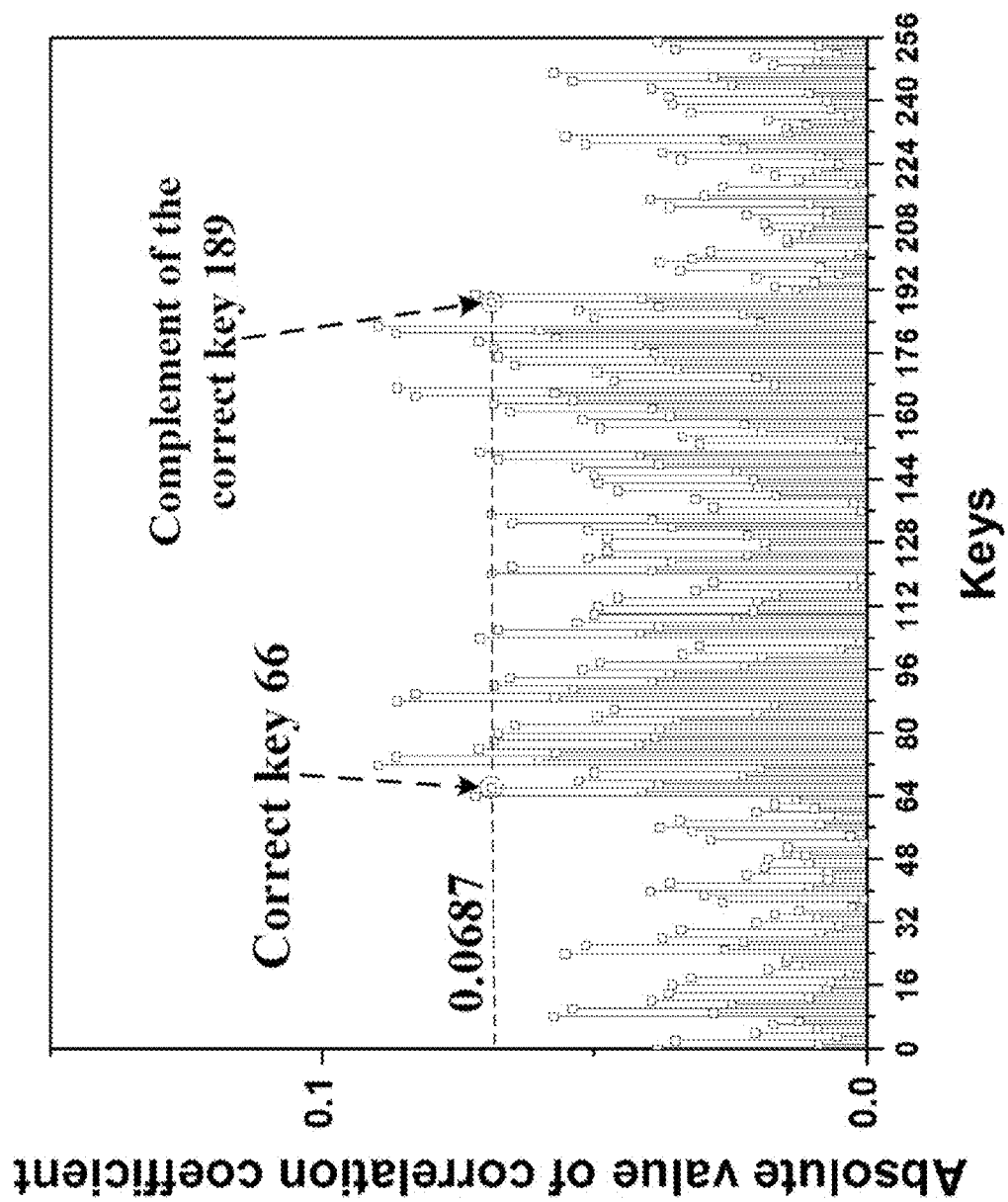

FIGS. 9A-9B illustrate, LPA attacks simulation (N=32 and $F_0$=10, according to some embodiments. Hamming-weight (HW) model is utilized where the correct key and complement of the correct key can be discriminated from the polarity of the correlation coefficient. Absolute value of the correlation coefficient is used to make the highest correlation coefficient visually more distinguishable). In FIG. 9A, all of the possible keys versus absolute value of the correlation coefficient for an S-box without countermeasure after analyzing 500 leakage power traces. In FIG. 9B, all of the possible keys versus absolute value of correlation coefficient for an S-box that employs a CoRe voltage converter after analyzing 2 million leakage power traces. In FIG. 9C all of the possible keys versus absolute value of the correlation coefficient for an S-box that employs an SA voltage converter after analyzing 2 million leakage power traces.

When LPA attacks are implemented (simulated) on an Sbox that does not house any Countermeasure, the correct key (which is $(66)_{10}$ in this example) is leaked to the attacker after analyzing 500 leakage power traces, as shown in FIG. 9A. When the attacker implements an LPA attack on an S-box that employs an SA voltage converter and lowers the clock frequency $f_c$ to $1/(10^4\ T_s)$. (clock frequency with lowest MTD enhancement ratio as shown in FIG. 5B, the correct key cannot be obtained by the attacker even after analyzing two million leakage power traces, as shown in FIG. 9C. By contrast, when the attacker lowers the clock frequency $f_c$ to $1/(10^4\ T_s)$ and implements an LPA attack on an S-box which employs a CoRe voltage converter, after analyzing 2 million leakage power traces, the correct key is leaked to the attacker, as shown in FIG. 9B. Therefore, as compared to an S-box that employs a CoRe voltage converter, the reshuffled redundant load power dissipation in the SA voltage converter can successfully act as noise to enhance the MTD value.

In conclusion, a security-adaptive (SA) voltage converter is utilized as a lightweight countermeasure against LPA attacks. The discharging resistor in the SA voltage converter can significantly increase the amount of noise insertion in the input power profile when LPA attacks are sensed by the proposed technique. Through scrambling the redundant load power dissipation in the input power profile, the MTD value of a cryptographic circuit that employs the SA voltage converter is enhanced over 6145 times as compared to the MTD value of a conventional cryptographic circuit that has no countermeasure.

Guidelines on the Selection of a Suitable Critical Frequency $F_{C,1}$ to Maximize Security Two different kinds of noise may impact the MTD enhancement ratio of a cryptographic circuit that employs a CoRe voltage converter: i) measurement power noise from devices that are used to perform the measurement and ii) reshuffling power noise from the CoRe voltage converter.

When a cryptographic circuit is in a normal working mode (i.e., clock frequency $f_c \approx F_1 f_s$ and $F_1$ is an integer), the measured input power $P_{MIP,i}$ of the CoRe voltage converter induced by the $i^{th}$ input data is $$P_{MIP,i} = P^*_{in,i}(\theta, 1/(F_1 f_s)) + P_{M,i}, \quad (15)$$

where $P^*_{in,i}(\theta, 1/(F_1 f_s))$ is the actual input power of the CoRe voltage converter induced by the $i^{th}$ input data and $P_{M,i}$ is the corresponding measurement power noise. When the variance of $P^*_{in,i}(\theta, 1/(F_1 f_s))$ is $\sigma_1^2(\theta, 1/(F_1 f_s))$, the average variance $\overline{\sigma_1^2(\theta, 1/(F_1 f_s))}$ of $P^*_{in,i}(\theta, 1/(F_1 f_s))$ becomes $$\overline{\sigma_1^2(1/(F_1 f_s))} = \frac{1}{2\pi}\int_0^{2\pi} \sigma_1^2(\theta, 1/(F_1 f_s))d\theta. \quad (16)$$

Accordingly, the signal-to-noise ratio (SNR) of the input power profile $SNR_M(1/(F_1 f_s))$ can be written as $$SNR_M(1/(F_1 f_s)) = \frac{\overline{\sigma_1^2(1/(F_1 f_s))}}{\sigma_M^2}, \quad (17)$$

where $\sigma_M^2$ is the variance of the measurement power noise.

However, when the attacker lowers the clock frequency from $F_1 f_s$ to $f_c$ (i.e., $F_1 f_s / f_c$ is an integer, the attacker can measure $F_1 f_s / f_c$ number of leakage power data), the total measured input power $P_{TMIP,i}$ of the CoRe voltage converter induced by the $i^{th}$ input data is $$P_{TMIP,i} = P^*_{in,i}(\theta, 1/f_c) + \sum_{j_1=1}^{F_1 f_s / f_c} P_{M,i,j_1}, \quad (18)$$

where $P_{M,i,j_1}$ is the corresponding measurement power noise related with the $j_1^{th}$ measurement under the $i^{th}$ input data. Therefore, the SNR of the input power profile $SNR_M(1/f_c)$ can be written as $$SNR_M(1/f_c) = \frac{\overline{\sigma_1^2(1/f_c)}}{\frac{F_1 f_s}{f_c}\sigma_M^2}. \quad (19)$$

The correlation coefficient $\gamma M(1/f_c)$ between the actual input power and measured input power of the CoRe voltage converter with measurement power noise when the clock frequency is $f_c$ can be written as $$\gamma_M(1/f_c) = \frac{1}{\sqrt{1 + \frac{1}{SNR_M(1/f_c)}}}. \quad (20)$$

When the clock frequency is fc and the average correlation coefficient between the actual input power and load power of the CoRe voltage converter is $\overline{\gamma_{Re}(1/f_c)}$, the measurement power noise and reshuffling power noise from the CoRe voltage converter are independent. The correlation coefficient $\gamma_t(1/f_c)$ between the measured input power and load power of the CoRe voltage converter can therefore be written as $$\gamma_t(1/f_c) = \gamma_M(1/f_c) \times \overline{\gamma_{Re}(1/f_c)}. \quad (21)$$

The total MTD enhancement ratio $MTD_t(1/f_c)$ induced by the measurement power noise and reshuffling power noise from the CoRe voltage converter is $$MTD_t(1/f_c) \propto \frac{1}{(\gamma_t(1/f_c))^2}. \quad (22)$$

As compared to a cryptographic circuit with the clock frequency of $(1/f_0) f_s$, the MTD value of a cryptographic circuit with the clock frequency of $f_c$ would be enhanced $f_s/(f_c\, F_0)$ times. $MTD_t(1/f_c)$ therefore becomes $$MTD_t(1/f_c) \simeq \frac{\frac{1}{F_0} f_s}{f_c} \times \frac{1}{(\gamma_t(1/f_c))^2}. \quad (23)$$

As shown in FIG. 3(b), the minimum MTD enhancement ratio of a cryptographic circuit with the SA voltage converter is 6145. When the MTD enhancement ratio induced by the measurement power noise and reshuffling power noise from the CoRe voltage converter is lower than the minimum MTD enhancement ratio induced by the SA voltage converter, the discharging resistor $R_c$ needs to be activated to trigger the SA voltage converter to enhance the security. Therefore, an approximately optimum critical frequency $F_{c,1}$ can be determined by solving $$MTD_t(1/F_{c,1}) \simeq \frac{\frac{1}{F_0} f_s}{F_{c,1}} \times \frac{1}{(\gamma_t(1/F_{c,1}))^2} = 6145." \quad (24)$$

Various features and advantages of the invention are set forth in the following claims.

What is claimed is:

1. A system for security adaptive voltage conversion, the system comprising:
    a voltage converter, the voltage converter having an input that is coupled to a power source and an output that is coupled to a cryptographic circuit, wherein the voltage converter receives input power from the power source via the input and supplies power to the cryptographic circuit via the output;
    a redundant discharge load that is connectable to the output of the voltage converter by a switch that is operable to connect or disconnect the redundant discharge load to the output of the voltage converter; and
    a clock frequency sensor coupled to the cryptographic circuit, wherein the clock frequency sensor detects a clock frequency of the cryptographic circuit and controls the connection or the disconnection of the redundant discharge load to the output of the voltage converter in response the detected clock frequency of the cryptographic circuit.

2. The system of claim 1, wherein the redundant discharge load sinks current from the voltage converter in addition to current sunk by the cryptographic circuit and increases the input power received from the power source.

3. The system of claim 1, wherein the voltage converter is a converter reshuffling voltage converter that alters the signature of the input power received from the power source.

4. The system of claim 1, wherein the voltage converter is a converter reshuffling voltage converter that scrambles power dissipation induced by the redundant discharge load.

5. The system of claim 1, wherein the redundant discharge load is connected to the output of the voltage converter when the clock frequency sensor detects that the clock frequency of the cryptographic circuit is within a specified range of frequencies.

6. The system of claim 1, wherein the redundant discharge load is connected to the output of the voltage converter when the clock frequency sensor detects that the clock frequency of the cryptographic circuit is within a specified range of frequencies.

7. The system of claim 1, wherein the redundant discharge load is disconnected from the voltage converter when the cryptographic circuit is in an idle mode.

8. The system of claim 1, wherein the redundant discharge load is disconnected from the voltage converter when the clock frequency sensor detects an appropriate operational frequency of the cryptographic circuit.

9. The system of claim 1, wherein the voltage converter functions as a converter reshuffling voltage converter when the redundant discharge load is disconnected from the voltage converter.

10. The system of claim 1, wherein the switch comprises one or more transistors.

11. A method for security adaptive voltage conversion, the method comprising:
    receiving input power from a power source via an input of a voltage converter and supplying power to a cryptographic circuit via an output of the voltage converter;
    detecting, by a clock frequency sensor coupled to the cryptographic circuit, a clock frequency of the cryptographic circuit and controlling a connection or a disconnection of a redundant discharge load to the output of the voltage converter in response the detected clock frequency of the cryptographic circuit, wherein
    the redundant discharge load is connectable to the output of the voltage converter by a switch that is operable to connect or disconnect the redundant discharge load to the output of the voltage converter.

12. The method of claim 11, wherein the redundant discharge load sinks current from the voltage converter in addition to current sunk by the cryptographic circuit and increases the input power received from the power source.

13. The method of claim 11, wherein the voltage converter is a converter reshuffling voltage converter that alters the signature of the input power received from the power source.

14. The method of claim 11, wherein the voltage converter is a converter reshuffling voltage converter that scrambles power dissipation induced by the redundant discharge load.

15. The method of claim 11, wherein the redundant discharge load is connected to the output of the voltage converter when the clock frequency sensor detects that the clock frequency of the cryptographic circuit is within a specified range of frequencies.

16. The method of claim 11, wherein the redundant discharge load is connected to the output of the voltage converter when the clock frequency sensor detects that the clock frequency of the cryptographic circuit is within a specified range of frequencies.

17. The method of claim 11, wherein the redundant discharge load is disconnected from the voltage converter when the cryptographic circuit is in an idle mode.

18. The method of claim 11, wherein the redundant discharge load is disconnected from the voltage converter when the clock frequency sensor detects an appropriate operational frequency of the cryptographic circuit.

19. The method of claim 11, wherein the voltage converter functions as a converter reshuffling voltage converter when the redundant discharge load is disconnected from the voltage converter.

20. The method of claim 11, wherein the switch comprises one or more transistors.

* * * * *